US007843553B2

(12) United States Patent
Skultety-Betz et al.

(10) Patent No.: US 7,843,553 B2
(45) Date of Patent: Nov. 30, 2010

(54) DISTANCE-MEASURING DEVICE

(75) Inventors: Uwe Skultety-Betz, Leinfelden-Echterdingen (DE); Bjoern Haase, Stuttgart (DE); Joerg Stierle, Waldenbuch (DE); Peter Wolf, Leinfelden-Echterdingen (DE); Cedric Pahud, Morges (CH); Kai Renz, Leinfelden-Echterdingen (DE); Clemens Schulte, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 11/911,237

(22) PCT Filed: Jun. 22, 2006

(86) PCT No.: PCT/EP2006/063464

§ 371 (c)(1),
(2), (4) Date: Oct. 11, 2007

(87) PCT Pub. No.: WO2007/012526

PCT Pub. Date: Feb. 1, 2007

(65) Prior Publication Data

US 2008/0192227 A1 Aug. 14, 2008

(30) Foreign Application Priority Data

Jul. 27, 2005 (DE) ....................... 10 2005 035 101

(51) Int. Cl.
*G01C 3/08* (2006.01)

(52) U.S. Cl. .................................... 356/4.01; 356/5.01

(58) Field of Classification Search ........ 356/4.01–5.15
See application file for complete search history.

(56) References Cited

U.S. PATENT DOCUMENTS

| | | | | |
|---|---|---|---|---|
| 6,781,675 B2 | 8/2004 | Gogolla et al. | | |
| 2002/0057883 A1 | 5/2002 | Malone et al. | | |
| 2003/0218737 A1 | 11/2003 | Gogolla et al. | | |
| 2008/0231829 A1* | 9/2008 | Hinchliff et al. | ........... | 356/4.01 |

FOREIGN PATENT DOCUMENTS

| | | |
|---|---|---|
| EP | 1 351 070 | 10/2003 |

OTHER PUBLICATIONS

Gregg J. Fokken et al: "Low-Cost, Multi-GHZ . . . " IEEE Transactions on Advanced Packaging, vol. 23, No. 1, Feb. 2000, pp. 42-54 (In English).

* cited by examiner

*Primary Examiner*—Isam Alsomiri
(74) *Attorney, Agent, or Firm*—Michael J. Striker

(57) ABSTRACT

The invention is based on a distance-measuring device, in particular a laser distance-measuring device (10) which is in the form of a handheld device, having a printed circuit board (18) and a transmitting or receiving unit (20, 22) which is provided for transmitting or receiving a measurement signal, and comprises a housing (30, 46, 82, 96, 130) which has a base surface (32, 48, 102, 140) which faces the printed circuit board (18), a side surface and a signal surface (38, 50, 98, 142). The invention proposes that the side surface is in the form of a signal surface (38, 50, 98, 142).

9 Claims, 5 Drawing Sheets

DISTANCE-MEASURING DEVICE

CROSS-REFERENCE TO A RELATED APPLICATION

The invention described and claimed hereinbelow is also described in German Patent Application DE 10 2005 035 101.8 filed on Jul. 27, 2005. This German Patent Application, whose subject matter is incorporated here by reference, provides the basis for a claim of priority of invention under 35 U.S.C. 119(a)-(d).

BACKGROUND OF THE INVENTION

The present invention is directed to a distance-measuring device, in particular a laser distance-measuring device designed as a hand-held device.

RELATED ART

Publication EP 1 351 070 A1 makes known a distance-measuring device with a printed circuit board, on which a laser diode for generating a measurement signal and a photodiode for receiving a measuring signal are installed. Each of these items includes a housing, which includes a glass cover that is permeable to a measurement signal.

SUMMARY OF THE INVENTION

The present invention is directed to a distance-measuring device, in particular a laser distance-measuring device designed as a hand-held device, with a printed circuit board and a transmitter or receiver unit provided for transmitting or receiving a measurement signal, and that includes a housing that includes a base surface facing the printed circuit board, a lateral surface, and a signal surface.

It is provided that the lateral surface is designed as a signal surface. It is advantageously possible to transmit or receive a measurement signal laterally through the housing of the transmitter or receiver unit. Particularly advantageously, transmission or receipt of a measurement signal oriented parallel to the printed circuit board may be attained with a simple design. To attain a high level of stability of the transmitter or receiver unit, the base surface may lie on the printed circuit board. In addition, the base surface may be installed directly on the printed circuit board. The housing may be bonded directly to the printed circuit board, thereby also resulting in a reliable electrical connection with the printed circuit board via the integral connection. The base surface is preferably designed as a flat surface. The base surface may be advantageously oriented parallel with the printed circuit board. In this context, a "lateral surface" refers to a surface of the housing that differs from the base surface and a cover surface located opposite to the base surface. The base surface and the lateral surface preferably form an angle between 30° and 120°. In addition, a "signal surface" refers to a surface that is located in a path of a measurement signal. The transmitter or receiver unit may be preferably provided for transmitting or receiving a visible light beam. The transmitter unit is advantageously designed as a laser diode, e.g., as a VCSEL (Vertical Cavity Surface Emitting Laser) diode. As an alternative, the transmitter or receiver unit may also be designed as transmitting or receiving means for further types of electromagnetic radiation, such as infrared or radar radiation, etc., or ultrasonic waves.

The housing advantageously includes at least two material layers, with an electrical connection being established between the material layers via a boundary surface. As a result, internal electrical connections of the housing may be easily and advantageously established, with a housing that is compact in design. The boundary surface may be formed by a contact surface, with which a material layer lies on an adjacent material layer. The housing may advantageously include a layering of several material layers, which are stacked as several levels of layers in a stacking direction. "Stacking direction" refers to a direction that is oriented transverse to the layer direction, and is perpendicular thereto in particular. A material layer may be located in a layer level. As an alternative, several adjoining material layers may be located in one layer level. An electrical connection may be established in one layer level or between two adjacent layer levels via a boundary surface between two material layers. To establish an electrical connection, the boundary surface is preferably coated with a conductive element, e.g., a soldering alloy.

The transmitter or receiver unit advantageously includes a diode chip, which is electrically connected with a boundary surface in at least two layer levels. As a result, electrical connections of the diode chip may be attained that are effectively insulated from each other electrically, e.g., by at least one layer thickness.

When the housing includes a soldering surface that is electrically connected with a boundary surface, and when the housing is soldered directly to the printed circuit board, a reliable electrical connection of the transmitter or receiver unit to the printed circuit board may be attained with minimal outlay. In addition, external connection elements for electrical contacting, e.g., leg-shaped connection pins, may be avoided, thereby resulting in a compact design of the transmitter or receiver unit. In addition, a good seal of the inner space of the housing to the outside may be attained, since this eliminates the need to feed external electrical connections into the interior through the housing. "Soldering surface" refers, in particular, to an outer surface of the housing that is coated with solder for soldering the housing to the printed circuit board.

In this context, it is also provided that the soldering surface is bounded by a boundary surface in the stacking direction. When the housing is provided with several soldering surfaces, via which an electrical connection is established with a boundary surface in a layer level, this results in effective electrical insulation between the boundary surfaces.

In one embodiment, the housing includes a recess with a soldering surface. When the housing is soldered to the printed circuit board, the solder may be prevented from spreading—which is undesirable—by allowing the solder, e.g., when reflow soldering is performed, to fill a space bounded by the recess and the printed circuit board. When the soldering surface is bounded in the stacking direction, an undesired contacting of a layer level beyond the limits of the soldering surface due to the solder spreading may be advantageously prevented.

In an advantageous refinement of the present invention, it is provided that the transmitter or receiver unit includes a fastening means, which is provided to install an outer surface—which differs from the base surface and the signal surface—on the printed circuit board. As a result, a range of application of the transmitter or receiver unit based on an orientation of the measurement signal relative to the printed circuit board may be advantageously increased. When the housing includes at least two fastening means that are designed as soldering surfaces and are located on two abutting outer surfaces, this flexibility may be easily attained, and a compact design of the transmitter or receiver unit may also be attained. The abutting outer surfaces are advantageously angled relative to each other.

It is furthermore provided that the transmitter or receiver unit includes redirecting means for redirecting the measurement signal, which is located in the housing. As a result, increased precision of distance measurements that are carried out for objects at close range and for which the measurement signal is oriented, e.g., at a parallactic angle relative to the printed circuit board, may be easily attained and with a compact design.

In this context, the manufacturing costs of the transmitter or receiver unit may be easily reduced by the fact that the redirecting means are integrally formed with the housing as a single piece.

Further advantages result from the description of the drawing, below. Exemplary embodiments of the present invention are shown in the drawing. The drawing, the description and the claims contain numerous features in combination. One skilled in the art will also advantageously consider the features individually and combine them to form further reasonable combinations.

DESCRIPTION OF THE PREFERRED EMBODIMENTS

Figure 1:
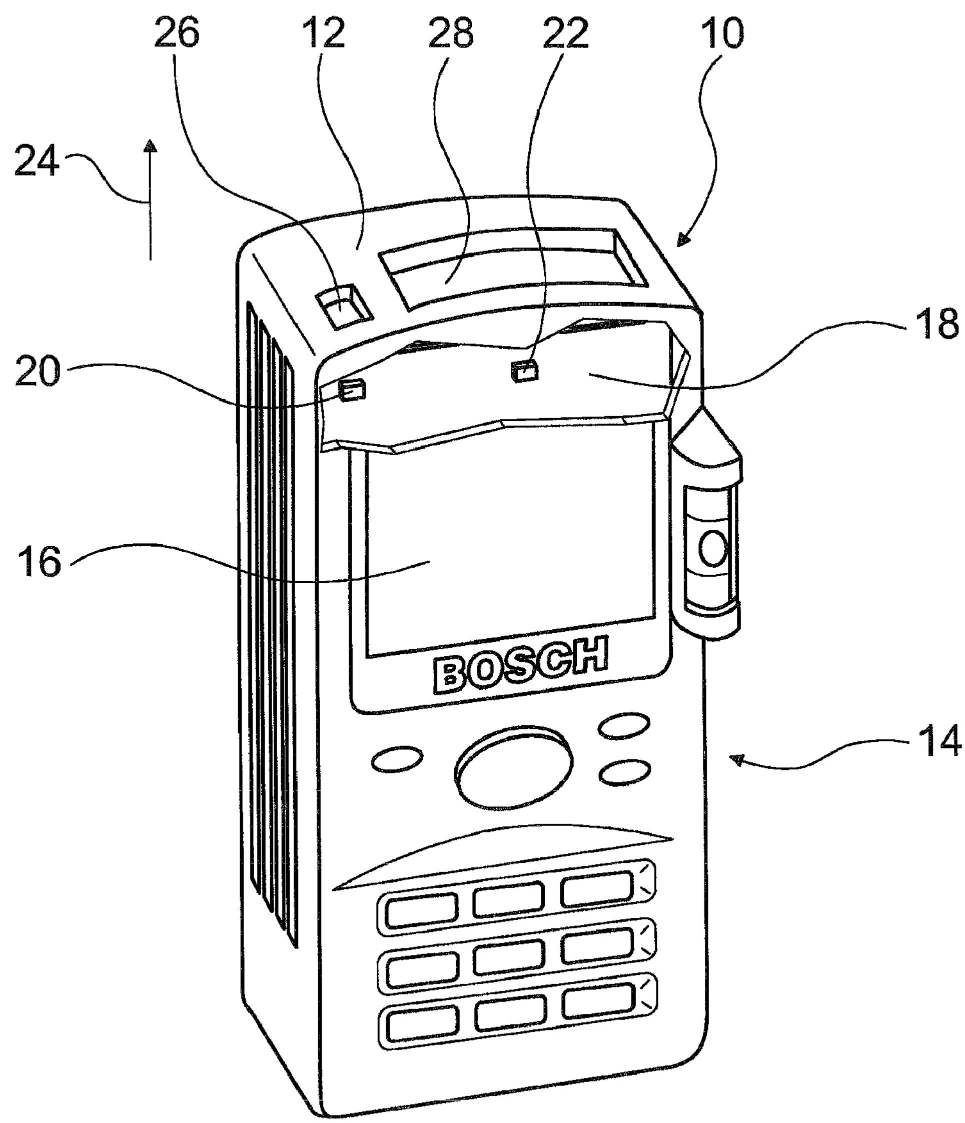
FIG. 1 shows a distance-measuring device with a printed circuit board, a transmitter unit, and a receiver unit.

FIG. 1 shows a distance-measuring device designed as a laser distance-measuring device 10. Laser distance-measuring device 10 includes a housing 12, actuating elements 14 for switching the distance-measuring device on and off, and for starting and configuring a measuring procedure, and it includes a display 16. A printed circuit board 18 is located inside housing 12, on which a transmitter unit 20 designed as a laser diode and a receiver unit 22 designed as a photo diode are installed. To measure a distance of laser distance-measuring device 10 from a remote object, during operation 1o of laser distance-measuring device 10, a transmitted measurement signal in the form of a light beam is sent from transmitter unit 20 via transmission optics 26 in a beam direction 24 oriented parallel to printed circuit board 18. The transmitted measurement signal reflected by a surface of the remote object is received as a received measurement signal by receiver unit 22 via receiving optics 28. The distance in question may be ascertained by comparing the transmitted measurement signal with the received measurement signal.

Figure 2:
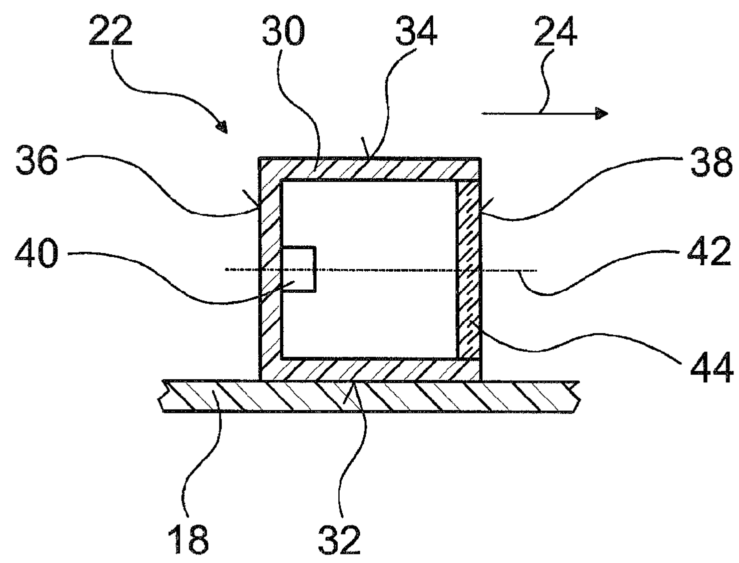
FIG. 2 shows the transmitter unit with a housing installed on the printed circuit board.

Printed circuit board 18 and receiver unit 22 are shown in a sectional view in FIG. 2. Receiver unit 22 includes a housing 30, which includes a base surface 32 soldered to printed circuit board 18, a cover surface 34 located opposite to base surface 32, a first lateral surface 36, a second lateral surface designed as a signal surface 38, and a diode chip 40 located in housing 30 for receiving the received measurement signal. Signal surface 38 is located on an optical axis 42—oriented parallel to printed circuit board 18—for the received measurement signal, and it is formed by a glass cover 44 that is permeable to the received measurement signal.

Figure 3:
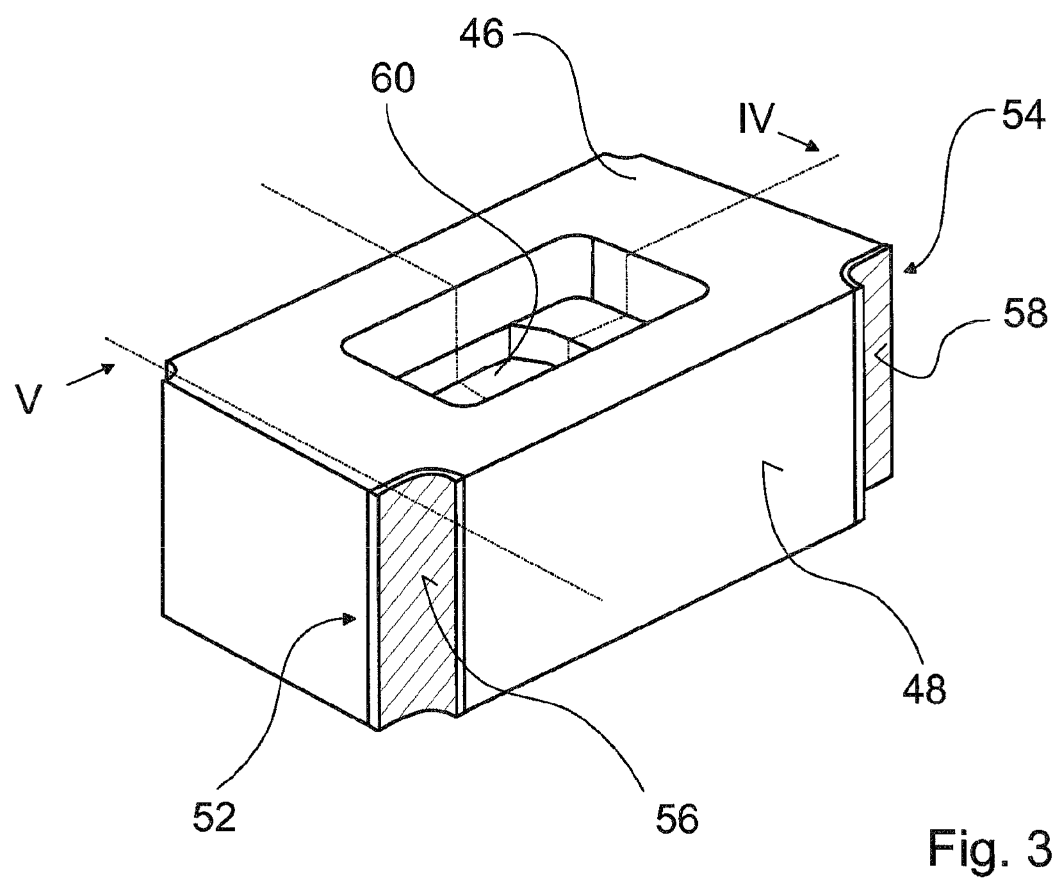
FIG. 3 shows an alternative housing of the transmitter unit, in a perspective view.
Figure 4:
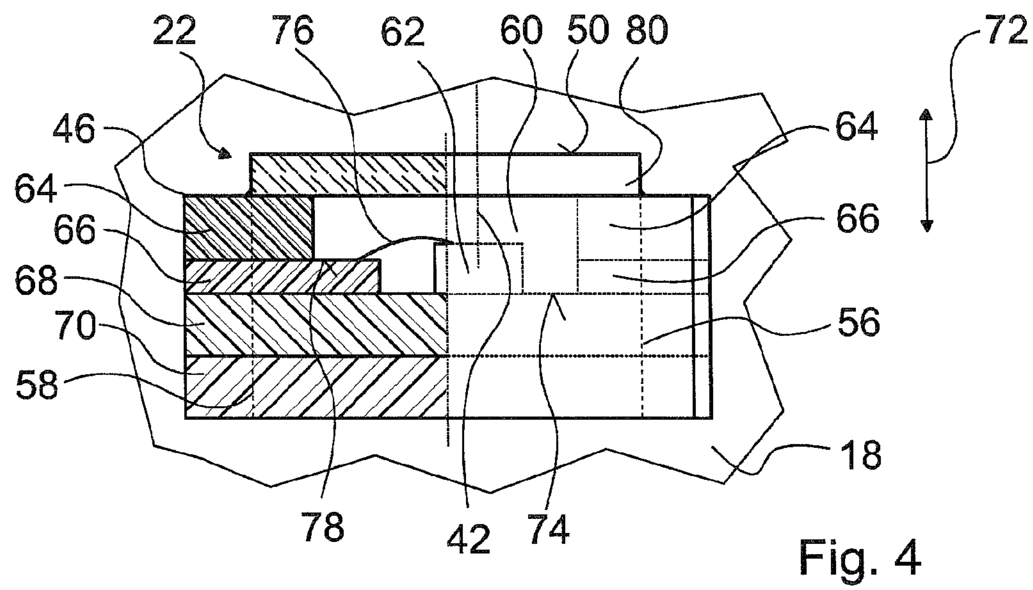
FIG. 4 shows the transmitter unit with the housing in FIG. 3 on the printed circuit board, in a partial sectional view.
Figure 6:
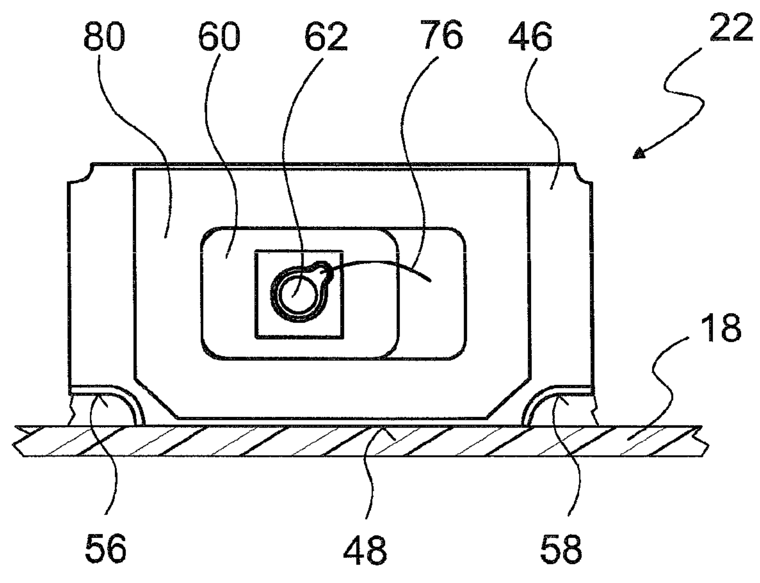
FIG. 6 shows the transmitter unit with the housing in FIG. 3 on the printed circuit board, in a top view.

A further embodiment of a housing 46 of receiver unit 22 is shown in a perspective view in FIG. 3. In the state in which receiver unit 22 is installed on printed circuit board 18, as shown in FIG. 6, a base surface 48 of housing 46 is installed on printed circuit board 18. Housing 46 also includes a lateral surface, which is designed as a signal surface 50, as shown in FIG. 4. To enable base surface 48 to be soldered to printed circuit board 18, housing 46 is provided with two recesses 52, 54, each of which includes a soldering surface 56 and 58. Soldering surfaces 56, 58 are each coated with a soldering alloy, which is depicted schematically as shading. When receiver unit 22 is installed on printed circuit board 18, as shown in FIG. 6, and when reflow soldering is employed, a space bounded by recess 52 and 54 and printed circuit board 18 is filled with the soldering alloy. Housing 46 also includes a recess 60, in which a diode chip 62 shown in FIG. 4 is located, in the assembled state of receiver unit 22.

Receiver unit 22 with housing 46 is shown in a partial sectional view in FIG. 4 in its assembled state and installed on printed circuit board 18. Housing 46 includes four material layers 64, 66, 68, 70, which are stacked in a stacking direction 72. Material layers 64, 66, 68, 70 are made of ceramic. Diode chip 62, which is soldered to boundary surface 74, is located in recess 60. Diode chip 62 is electrically connected with boundary surface 74 via the soldered connection. Furthermore, diode chip 62 is also electrically connected with a boundary surface 78, i.e., via a bonding wire 76, which is soldered to diode chip 62 and boundary surface 78. Boundary surface 74 and 78 includes a soldering alloy so that diode chip 62 and bonding wire 76 may be soldered. As shown in detail in FIG. 5, this soldering alloy is in contact with soldering surface 56 and 58. As a result, an electrical connection is established between boundary surface 74 and 78 and soldering surface 56 and 58. Diode chip 62 is therefore electrically connected with printed circuit board 18 via boundary surface 74, and soldering surface 56 is electrically connected with printed circuit board 18 in a first layer level and via boundary surface 78, and soldering surface 58 is electrically connected with printed circuit board 18 in a second layer level. Recess 60 is insulated to the outside by a glass cover 80, which forms signal surface 50. In one embodiment, housing 46 may be made of a single-pieced plastic part that is provided with a pressed screen. In this case, housing 46 includes material layers that are stacked in several layer levels in a stacking direction, which is oriented parallel to one of the screen axes. Adjacent material layers in two different layer levels and/or within one layer level may abut each other with a boundary surface, a boundary surface being formed by boundary surfaces of elementary screen cells. The pressed screen is preferably made of a conductive material, thereby enabling an internal electrical connection to be established in housing 46 and enabling an electrical connection with a soldering surface for soldering housing 46 to printed circuit board 18 to be established via the pressed screen.

Figure 5:
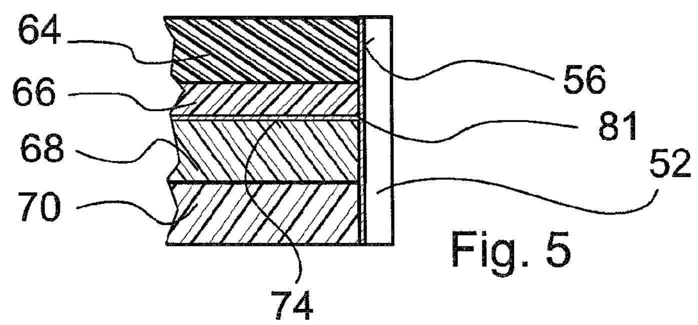
FIG. 5 shows a contact point of the housing in FIG. 3.

FIG. 5 shows a further side view of housing 46, including material layers 64, 66, 68, 70 and recess 52 with soldering surface 56. Boundary surface 74, on which diode chip 62 is soldered (FIG. 4), is coated with a soldering alloy, which is continuous under material layer 66 to a contact point 81 with soldering surface 56.

FIG. 6 shows the positioning of receiver unit 22 with housing 46 on printed circuit board 18, in a top view.

Figure 7:
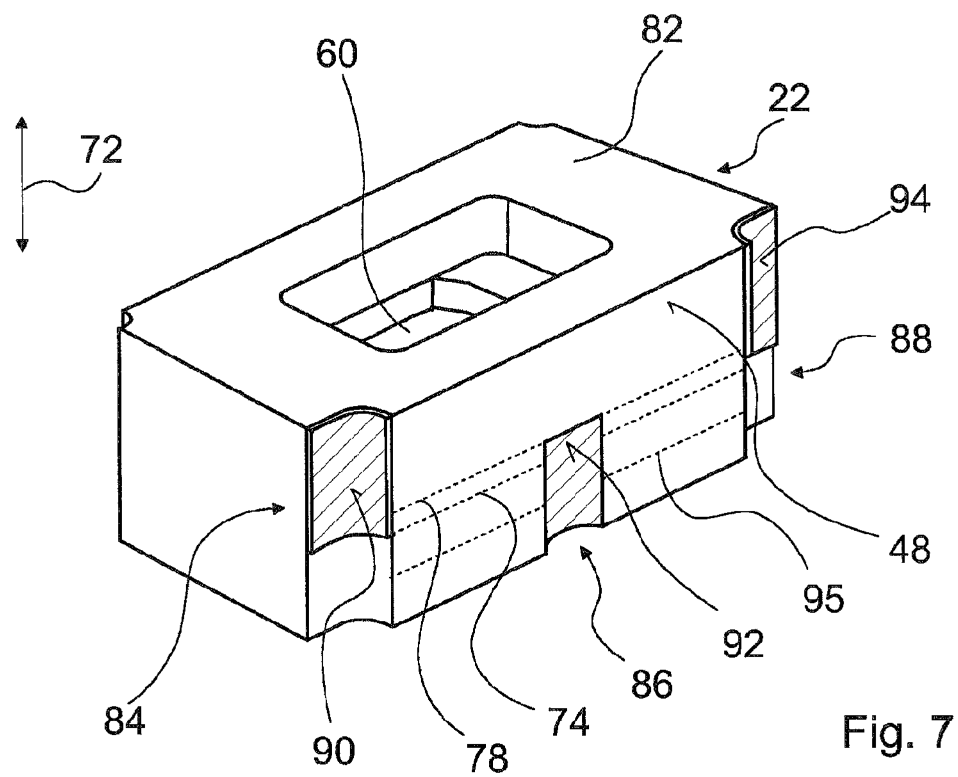
FIG. 7 shows an alternative housing with three recesses.

An alternative embodiment of a housing 82 of receiver unit 22 is shown in a perspective view in FIG. 7. The description below is limited to the differences between the designs of housings 46 and 82. Identical parts of housings 46 and 82 are provided with the same reference numerals. Housing 82 includes three recesses 84, 86, 88, each of which includes a soldering surface 90, 92, 94 for soldering base surface 48 to printed circuit board 18. In the state in which receiver unit 22 is installed on printed circuit board 18, an electrical connection between printed circuit board 18 and diode chip 62 is established via soldering surfaces 90, 94 and boundary surfaces 74, 78 in two layer levels and, in fact, in the manner described above with reference to FIGS. 4 and 5. A ground connection of diode chip 62 to printed circuit board 18 is established via a boundary surface 95 on a third layer level, which is lower in stacking direction 72, the third layer level being electrically connected with diode chip 62 and soldering surface 92. To attain effective electrical insulation between the lower layer level and the upper layer levels, soldering surface 92 is bounded by boundary surface 78, and soldering surfaces 90, 94 are bounded by boundary surface 74 in stacking direction 72.

Figure 8:
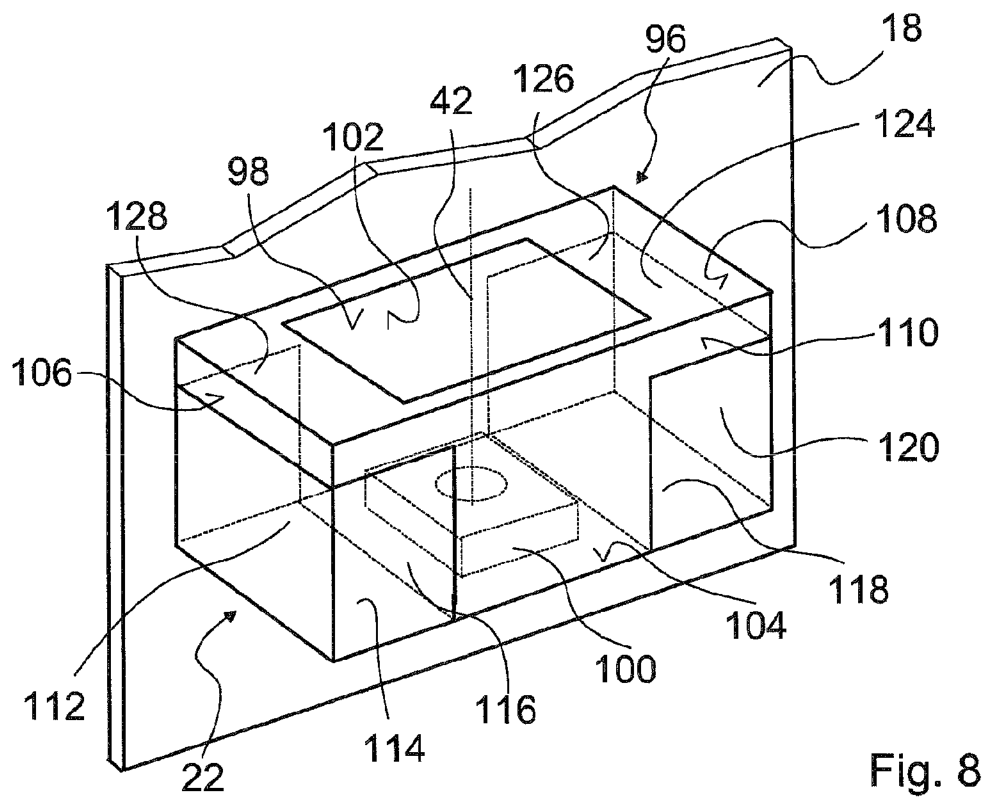
FIG. 8 shows the transmitter unit with an alternative housing with soldering surfaces.

Receiver unit 22 is depicted schematically in FIG. 8 with a further embodiment of a housing 96. Housing 96 includes a signal surface 98, which is permeable to a measurement signal received by a diode chip 100, and it includes a base surface 102, which is soldered to printed circuit board 18. Housing 96 also includes outer surfaces 104, 106, 108, 110, which differ from base surface 102 and signal surface 98. Base surface 102 and outer surfaces 104, 106, 108, 110 are provided with fastening means 112, 114, 116, 118, 120, 124, 126, 128, which are designed as soldering surfaces. In one assembly variant, one of the outer surfaces 104, 106, 108, 110 may be soldered to printed circuit board 18 using one of the fastening means 112, 114, 116, 118, 120, 124, thereby enabling a different orientation of a measurement signal generated by diode chip 100 relative to printed circuit board 18 to be attained.

In all of the exemplary embodiments described above, transmitter unit 20 and receiver unit 22 are identical in terms of design and in the manner in which they are installed on printed circuit board 18. Identical reference numerals are used for identical parts of transmitter unit 20 and receiver unit 22.

Figure 9:
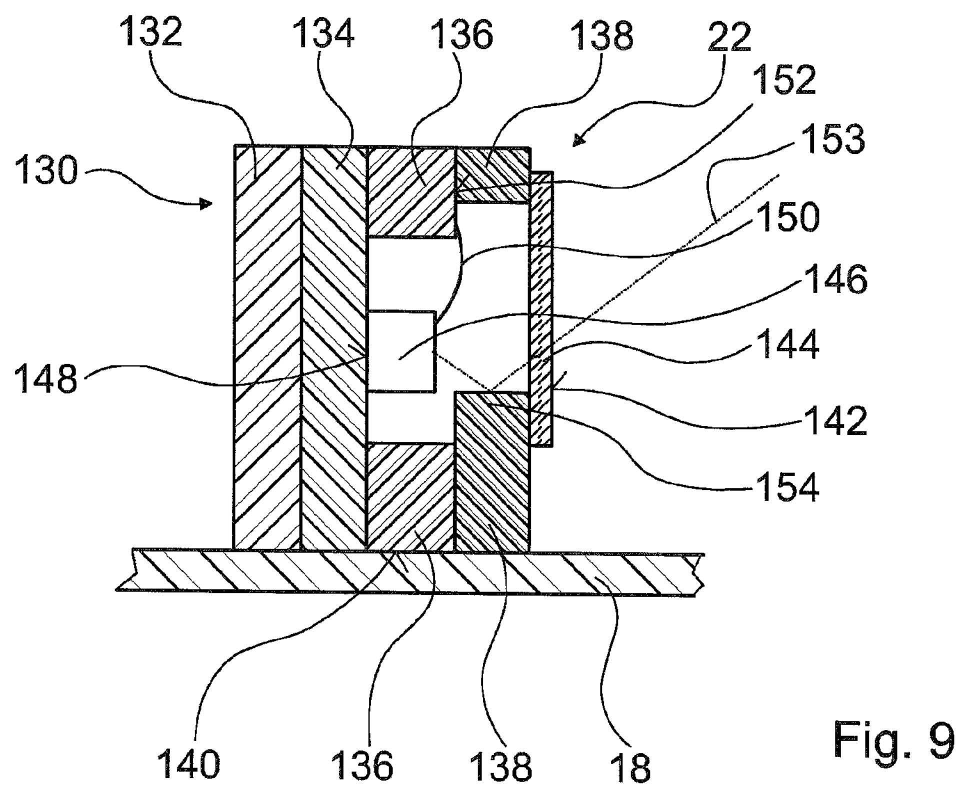
FIG. 9 shows the receiver unit with redirecting means.

An alternative embodiment of a housing 130 of receiver unit 22 is shown in a sectional view in FIG. 9. Housing 130, which includes several material layers 132, 134, 136, 138, is soldered via a base surface 140 to printed circuit board 18. A lateral surface of housing 130 is designed as signal surface 142, and it is formed by a glass cover 144, which is permeable to the received measurement signal. As an alternative, it is feasible to eliminate glass cover 144, or for signal surface 142 to be formed by a casting compound. A diode chip 146 soldered to a boundary surface 148 is located in housing 130. As described above for receiver unit 22 with reference to FIG. 4, diode chip 146 is electrically connected with boundary surface 148 and via a bonding wire 150 with a boundary surface 152. Boundary surfaces 148, 152 are electrically connected with soldering surfaces—not shown—of housing 130, via which housing 130 is soldered to printed circuit board 18. As a result, diode chip 146 is electrically connected to printed circuit board 18. When measuring the distance of an object located at close range, a received measurement signal in the form of a light beam 153 may be strike signal surface 142 at a parallactic angle relative to printed circuit board 18. Receiver unit 22 is provided with redirecting means 154 1o allow a received measurement signal of this type to be received by diode chip 146. Redirecting means 154 are formed by an extension of material layer 138, which is also coated with reflecting means.

Figure 10:
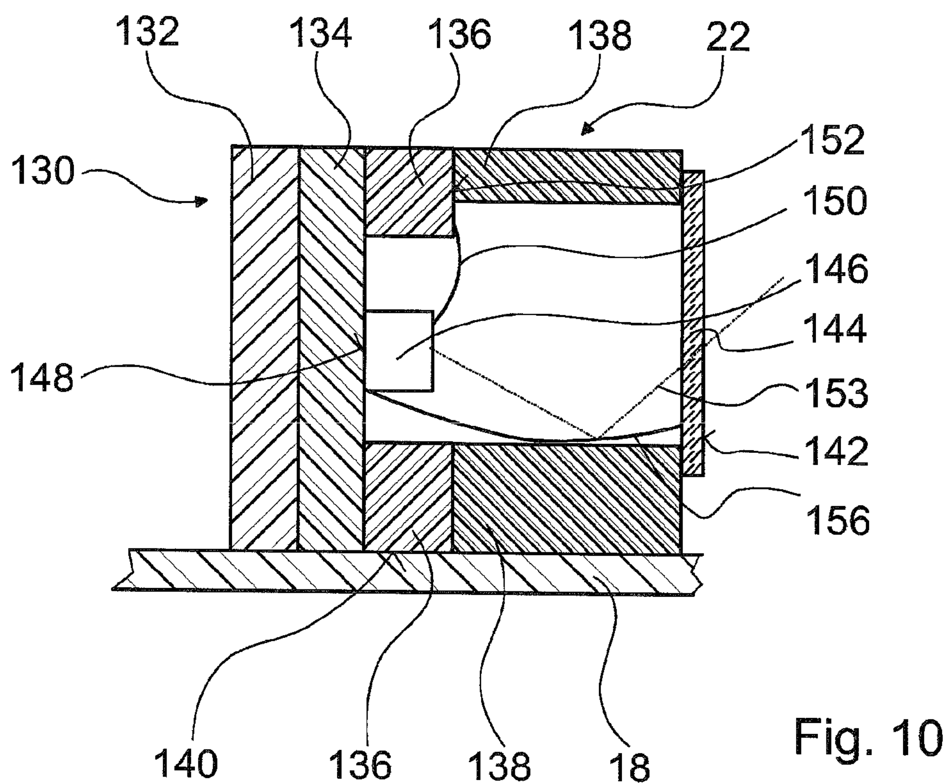
FIG. 10 shows the receiver unit with alternative redirecting means.

An embodiment of receiver unit 22 is shown in FIG. 10. It includes redirecting means 156, which are located in housing 130.

In a further exemplary embodiment, transmitter unit 20 is designed and is installed on printed circuit board 18 in the manner described above for receiver unit 22.

What is claimed is:

1. A hand-held laser distance-measuring device (10) comprising a device housing (12), a printed circuit board (18) and a transmitter or receiver unit (20, 22) locating inside said device housing (12) and transmitting or receiving a measurement signal, wherein the unit includes a unit housing (30, 46, 82, 96, 130) with a base surface (32, 48, 102, 140) extending substantially over the printed circuit board (18) and facing the printed circuit board (18), a lateral surface extending transversely to the base surface (32, 48, 102, 140) and to the printed circuit board (18), and a signal surface (38, 50, 98, 142), wherein the lateral surface is designed as a signal surface (38, 50, 98, 142).

2. A hand-held laser distance-measuring device as recited in claim 1, wherein the unit housing (46, 82, 130) includes at least two material layers (64, 66, 68, 70, 132, 134, 136, 138), with an electrical connection being established via a boundary surface (74, 78, 95, 148, 152) between the material layers (64, 66, 68, 70, 132, 134, 136, 138).

3. A hand-held laser distance-measuring device (10) comprising a device housing (12), a printed circuit board (18) and a transmitter or receiver unit (20, 22) locating inside said device housing (12) and transmitting or receiving a measurement signal, wherein the unit includes a unit housing (30, 46, 82, 96, 130) with a base surface (32, 48, 102, 140) extending substantially over the printed circuit board (18) and facing the printed circuit board (18), a lateral surface extending transversely to the base surface (32, 48, 102, 140) and to the printed circuit board (18), and a signal surface (38, 50, 98, 142), wherein the lateral surface is designed as a signal surface (38, 50, 98, 142), wherein the unit housing (46, 82, 130) includes at least two material layers (64, 66, 68, 70, 132, 134, 136, 138), with an electrical connection being established via a boundary surface (74, 78, 95, 148, 152) between the material layers (64, 66, 68, 70, 132, 134, 136, 138) and wherein the transmitter or receiver unit (20, 22) includes a diode chip (62, 146), which is electrically connected with a boundary surface (74, 78, 148, 152) in at least two layer levels.

4. The hand-held laser distance-measuring device as recited in claim 3, wherein the unit housing (46, 82) includes a soldering surface (56, 58, 90, 92, 94), which is electrically connected with a boundary surface (74, 78, 95).

5. The distance-measuring device as recited in claim 4, wherein the soldering surface (90, 92, 94) is bounded by a boundary surface (74, 78) in the stacking direction.

6. The hand-held laser distance-measuring device as recited in claim 3, wherein the unit housing (46, 82) includes a recess (52, 54, 84, 86, 88) with a soldering surface (56, 58, 90, 92, 94).

7. The hand-held laser distance-measuring device as recited in claim 3, wherein the transmitter or receiver unit (20, 22) includes fastening means (112, 114, 116, 118, 120, 124) fastening an outer surface (104, 106, 108, 110) —which is different from the base surface (102) and the signal surface (98) —to the printed circuit board (18).

8. The hand-held laser distance-measuring device as recited in claim 7, wherein the unit housing (96) includes at least two fastening means (112, 114, 116, 118, 120, 124) designed as soldering surfaces, which are located on outer surfaces (104, 106, 108, 110) that abut each other.

9. A hand-held laser distance-measuring device (10), with a printed circuit board (18) and a transmitter or receiver unit (20, 22) transmitting or receiving a measurement signal, wherein the unit includes a housing (30, 46, 82, 96, 130) with a base surface (32, 48, 102, 140) extending substantially over the printed circuit board and facing the printed circuit board (18), a lateral surface extending transversely to the base surface (32, 48, 102, 140) and to the printed circuit board (18), and a signal surface (38, 50, 98, 142), wherein the lateral surface is designed as the signal surface (38, 50, 98, 142), wherein the transmitter or receiver unit (20, 22) includes redirecting means (154, 156) redirecting the measurement signal, which are located in the housing (130), and wherein the redirecting means (154) are integrally formed with the housing (130) as a single piece.

* * * * *